(12) United States Patent
Chih

(10) Patent No.: US 11,146,881 B2
(45) Date of Patent: Oct. 12, 2021

(54) WIRELESS BLUE-TOOTH EARPHONE

(71) Applicant: Cheng Uei Precision Industry Co., Ltd., New Taipei (TW)

(72) Inventor: Tzu Chun Chih, New Taipei (TW)

(73) Assignee: Cheng Uei Precision Industry Co., Ltd., New Taipei (TW)

(*) Notice: Subject to any disclaimer, the term of this patent is extended or adjusted under 35 U.S.C. 154(b) by 0 days.

(21) Appl. No.: 17/123,159

(22) Filed: Dec. 16, 2020

(65) Prior Publication Data
US 2021/0250673 A1 Aug. 12, 2021

Related U.S. Application Data

(60) Provisional application No. 62/971,400, filed on Feb. 7, 2020.

(51) Int. Cl.
| | | |
|---|---|---|
| H04R 1/10 | (2006.01) |
| H02J 7/00 | (2006.01) |
| E05D 3/12 | (2006.01) |
| E05D 5/14 | (2006.01) |
| E05D 7/10 | (2006.01) |

(52) U.S. Cl.
CPC ............ H04R 1/1025 (2013.01); E05D 3/12 (2013.01); E05D 5/14 (2013.01); E05D 7/1011 (2013.01); H02J 7/0045 (2013.01); H04R 1/1016 (2013.01); H04R 1/1041 (2013.01); H04R 1/1075 (2013.01); *E05Y 2900/606* (2013.01); *H04R 2420/07* (2013.01)

(58) Field of Classification Search
CPC ........... H04R 1/1025; E05D 3/12; E05D 5/14; E05D 7/1011; H02J 7/0045
See application file for complete search history.

(56) References Cited

U.S. PATENT DOCUMENTS

| | | | |
|---|---|---|---|
| 10,827,249 B1* | 11/2020 | Pine | H04R 1/1016 |
| 2017/0093079 A1* | 3/2017 | Wagman | H04R 1/1058 |
| 2018/0091884 A1* | 3/2018 | Minoo | H04R 1/1091 |
| 2019/0069066 A1* | 2/2019 | Song | H04R 1/1016 |
| 2019/0222916 A1* | 7/2019 | Kim | H04R 1/1025 |
| 2020/0260176 A1* | 8/2020 | Baltensperger | H04R 1/1025 |

* cited by examiner

*Primary Examiner* — Simon King
(74) *Attorney, Agent, or Firm* — Lin & Associates IP, Inc.

(57) ABSTRACT

A wireless blue-tooth earphone chargeable by a charging case, includes an earphone shell, an earplug assembled to a bottom of the earphone shell, a speaker unit, a circuit board assembly and a contact assembly. The earphone shell has an accommodating space penetrating through a lower portion of the earphone shell. One end of a peripheral surface of the earphone shell is recessed inward to form a recess. The speaker unit is accommodated in a front end of the accommodating space. The circuit board assembly is accommodated in a rear end of the accommodating space and is connected with the speaker unit. The circuit board assembly is equipped with a plurality of elastic elements. The contact assembly fastened in the recess, has a plurality of conducting elements. The plurality of the elastic elements are electrically connected with the plurality of the conducting elements.

20 Claims, 8 Drawing Sheets

WIRELESS BLUE-TOOTH EARPHONE

CROSS-REFERENCE TO RELATED APPLICATION

This application claims the priorities of U.S. provisional patent application No. 62/971,400, filed on Feb. 7, 2020, which is incorporated herewith by reference.

BACKGROUND OF THE INVENTION

1. Field of the Invention

The present invention generally relates to a wireless earphone, more particularly to a wireless blue-tooth earphone which avoids a poor charging contact of the wireless blue-tooth earphone at the time of the wireless blue-tooth earphone being charged.

2. The Related Art

Usually, wireless blue-tooth earphones are light. When a user wears a wireless blue-tooth earphone to run, ride a bike or do outdoor exercises, the user is freer and more comfortable on account of the wireless blue-tooth earphone being constrained by a cable.

Referring to FIG. 8, a conventional wireless blue-tooth earphone 100' is generally assembled in a charging case which is matched with the conventional wireless blue-tooth earphone 100', and the conventional wireless blue-tooth earphone 100' is charged by virtue of the conventional wireless blue-tooth earphone 100' being inserted into the charging case. The conventional wireless blue-tooth earphone 100' includes a mechanical charging structure 51'. However, the charging case which is matched with the mechanical charging structure 51' of the conventional wireless blue-tooth earphone 100' uses pogo pins to connect the charging case with the conventional wireless blue-tooth earphone 100'. Contacting areas of the pogo pins of the mechanical charging structure 51' and the charging case are frequently small, and the contacting areas of the pogo pins of the mechanical charging structure 51' and the charging case are difficult to be aligned, consequently, a poor charging contact problem and a charging failure problem of the conventional wireless blue-tooth earphone 100' is happened frequently.

Therefore, it is necessary to provide an innovative wireless blue-tooth earphone which avoids a poor charging contact and a charging failure of the innovative wireless blue-tooth earphone at the time of the innovative wireless blue-tooth earphone being charged.

SUMMARY OF THE INVENTION

An object of the present invention is to provide a wireless blue-tooth earphone. The wireless blue-tooth earphone is chargeable by a charging case. The charging case is equipped with a plurality of conductive pieces. The wireless blue-tooth earphone includes an earphone shell, an earplug assembled to a bottom of the earphone shell, a speaker unit, a circuit board assembly and a contact assembly. The earphone shell has an accommodating space penetrating through a lower portion of the earphone shell. One end of a peripheral surface of the earphone shell is recessed inward to form a recess. The recess extends along the one end of the peripheral surface of the earphone shell. The speaker unit is accommodated in a front end of the accommodating space. The circuit board assembly is accommodated in a rear end of the accommodating space and is connected with the speaker unit. A lower surface of the circuit board assembly is equipped with a plurality of elastic elements arranged next to the recess. The contact assembly is fastened in the recess. The contact assembly has a plurality of conducting elements arranged in the recess and along a horizontal direction. The plurality of the conducting elements are juxtaposed. The plurality of the elastic elements are electrically connected with the plurality of the conducting elements. Each conducting element has a camber structure extending sideward and along the one end of the peripheral surface of the earphone shell. The camber structures of the plurality of the conducting elements resist against the plurality of the conductive pieces. The camber structure of each conducting element is received in the recess and is covered to the recess along the horizontal direction.

Another object of the present invention is to provide a wireless blue-tooth earphone. The wireless blue-tooth earphone is chargeable by a charging case. The charging case is equipped with a plurality of conductive pieces. The wireless blue-tooth earphone includes an earphone shell, an earplug assembled to a bottom of the earphone shell, a speaker unit, a circuit board assembly and a contact assembly. The earphone shell has an accommodating space penetrating through a lower portion of the earphone shell. One end of a peripheral surface of the earphone shell is recessed inward to form a recess. The speaker unit is accommodated in a front end of the accommodating space. The circuit board assembly is accommodated in a rear end of the accommodating space and is connected with the speaker unit. A lower surface of the circuit board assembly is equipped with a plurality of elastic elements arranged next to the recess. The contact assembly is fastened in the recess. The contact assembly has a plurality of conducting elements arranged in the recess. The plurality of the conducting elements include a positive conduction part, a negative conduction part, and a conduction component located between the positive conduction part and the negative conduction part. The positive conduction part, the negative conduction part and the conduction component are fastened in the recess. The positive conduction part, the conduction component and the negative conduction part are juxtaposed from one side of the recess to the other side of the recess. The plurality of the elastic elements are electrically connected with the plurality of the conducting elements. The positive conduction part has a positive camber structure extended along an extending direction of the one side of the recess, and the negative conduction part has a negative camber structure extended along an extending direction of the other side of the recess. The conduction component has a circular camber structure. The positive camber structure is covered to an inner wall of the one side of the recess. The negative camber structure is covered to an inner wall of the other side of the recess. The circular camber structure is arranged in a middle of the recess and is located between the positive camber structure and the negative camber structure. The positive camber structure, the circular camber structure and the negative camber structure resist against the plurality of the conductive pieces of the charging case.

Another object of the present invention is to provide a wireless blue-tooth earphone. The wireless blue-tooth earphone is chargeable by a charging case. The charging case is equipped with a plurality of conductive pieces. The wireless blue-tooth earphone includes an earphone shell, an earplug assembled to a bottom of the earphone shell, a speaker unit, a circuit board assembly and a contact assembly. The earphone shell has an accommodating space penetrating through a lower portion of the earphone shell. One end of a peripheral surface of the earphone shell is recessed inward to form a recess. The speaker unit is accommodated in the accommodating space. The circuit board assembly is accommodated in the accommodating space and is connected with the speaker unit. The contact assembly is fastened in the recess. The contact assembly has a plurality of conducting elements arranged in the recess. The plurality of the conducting elements are juxtaposed along a horizontal direction. Each conducting element has a camber structure extending sideward and along the one end of the peripheral surface of the earphone shell. An outer surface of the camber structure is curved along the horizontal direction and an up-down direction vertical to the horizontal direction. The camber structures of the plurality of the conducting elements resist against the plurality of the conductive pieces. The camber structure of each conducting element is received in the recess and is covered to the recess.

As described above, the circuit board assembly is electrically connected with the plurality of the conducting elements by virtue of the plurality of the contact portions of the plurality of the elastic elements being electrically connected with the connecting portions of the plurality of the conducting elements, and the positive camber structure extended along the extending direction of the one side of the recess, and the negative camber structure extended along the extending direction of the other side of the recess, so that the positive camber structure is covered to the inner wall of the one side of the recess to increase a contact area of the positive camber structure resisting against the charging case at the time of the wireless blue-tooth earphone being charged by the charging case, and the negative camber structure is covered to the inner wall of the other side of the recess to increase a contact area of the negative camber structure resisting against the charging case at the time of the wireless blue-tooth earphone being charged by the charging case, when the wireless blue-tooth earphone is inserted into the charging case which is matched with the wireless blue-tooth earphone to be charged, a poor contact phenomenon between the wireless blue-tooth earphone and the charging case is prevented from being occurred.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
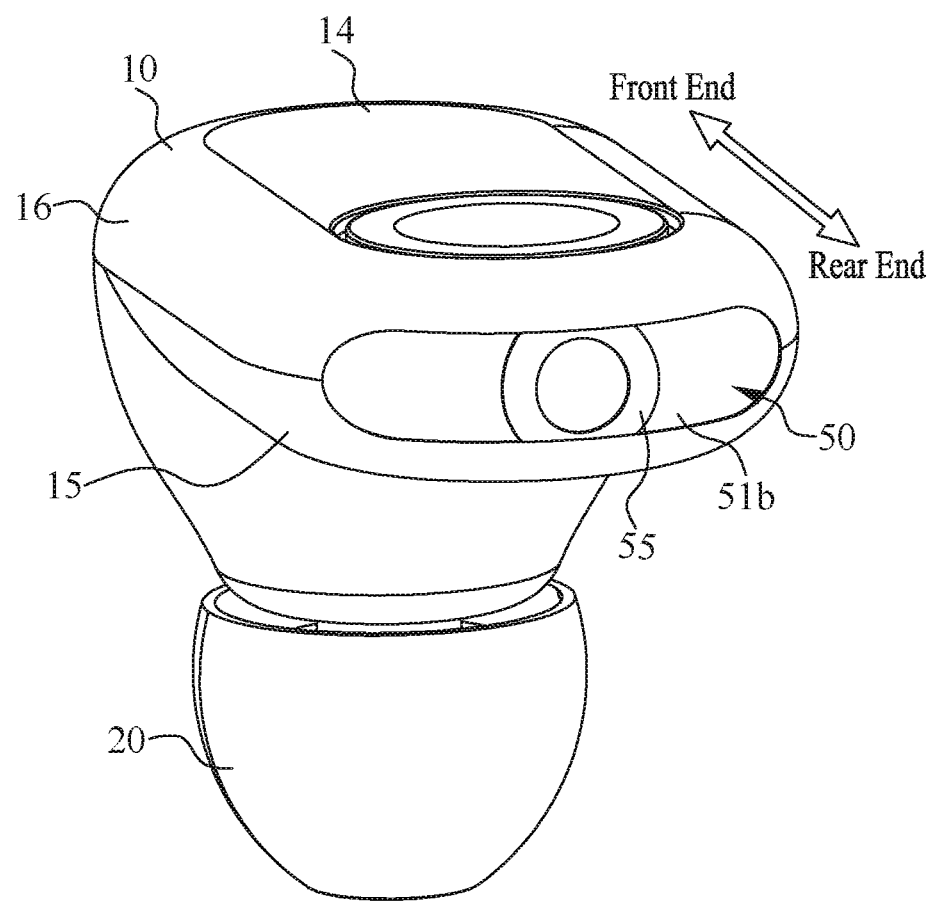
FIG. 1 is a perspective view of a wireless blue-tooth earphone in accordance with the present invention.
Figure 2:
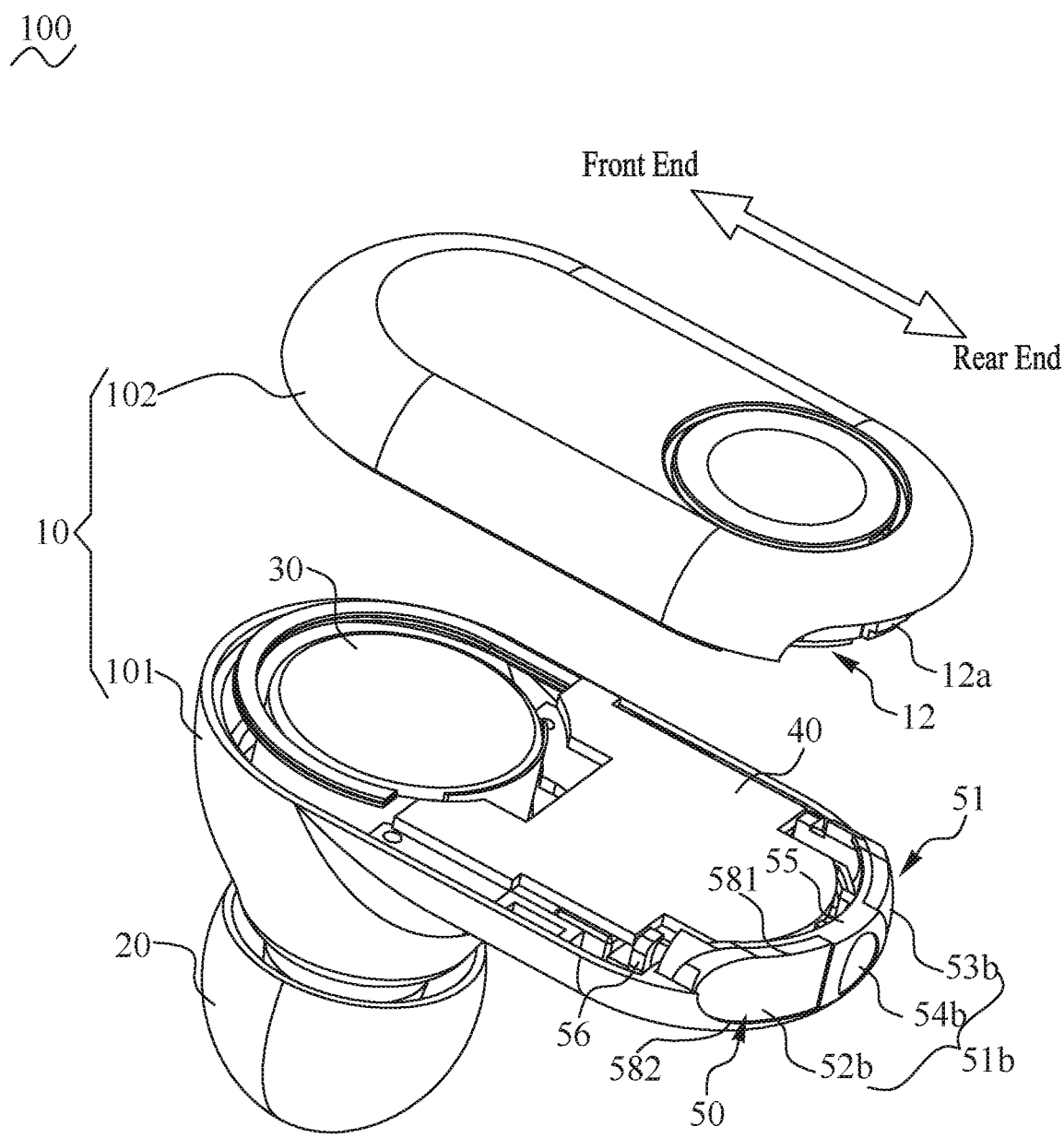
FIG. 2 is an exploded view of the wireless blue-tooth earphone in accordance with the present invention.
Figure 7:
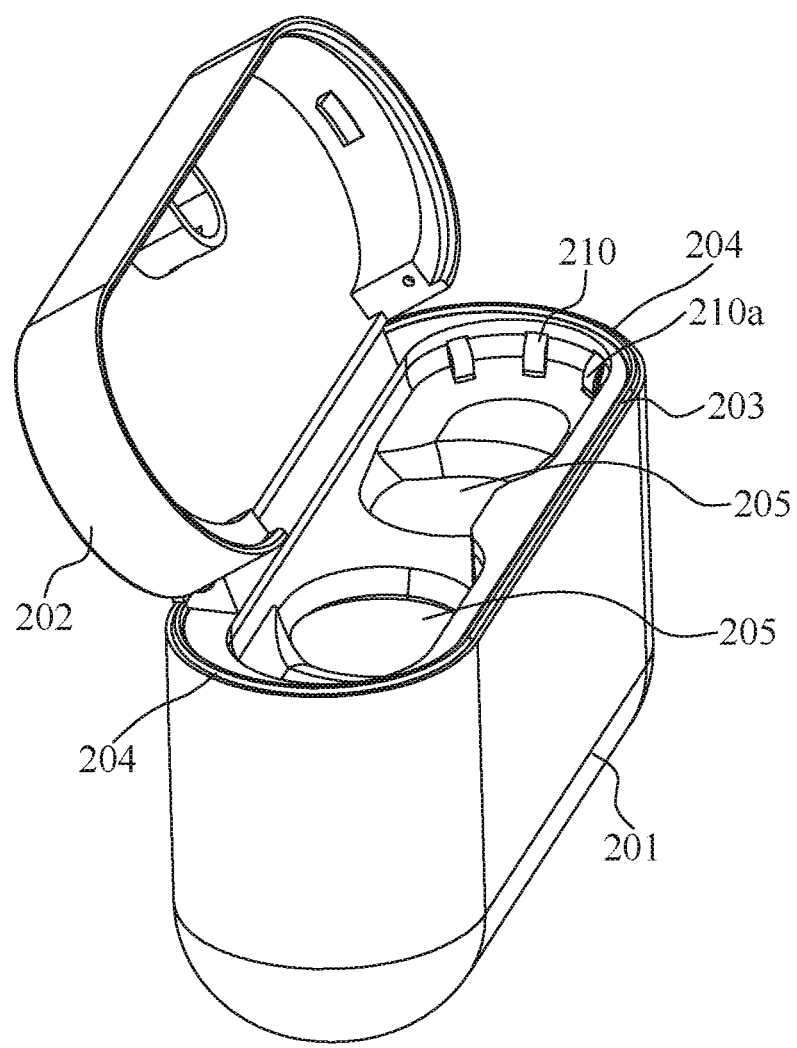
FIG. 7 is a perspective view of a charging case which is matched with the wireless blue-tooth earphone in accordance with the present invention.
Figure 8:
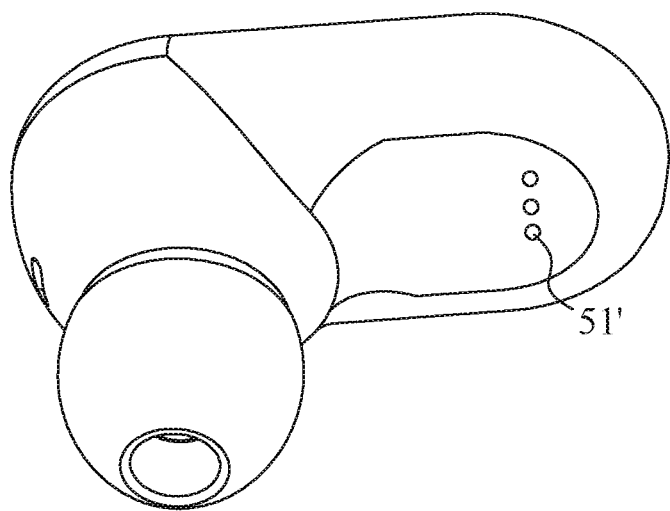
FIG. 8 is a diagrammatic drawing of a conventional wireless blue-tooth earphone.

Referring to FIG. 1, FIG. 2 and FIG. 7, a wireless blue-tooth earphone 100 in accordance with the present invention is shown. The wireless blue-tooth earphone 100 includes an earphone shell 10, an earplug 20, a speaker unit 30, a circuit board assembly 40 and a contact assembly 50. The wireless blue-tooth earphone 100 is chargeable by a charging case 200.

The earphone shell 10 includes a lower shell 101, and an upper shell 102 covered to the lower shell 101. The earphone shell 10 is hollow. The earphone shell 10 has an accommodating space 11 penetrating through a lower portion of the earphone shell 10. One end of a peripheral surface 16 of the earphone shell 10 is recessed inward to form a recess 12. The recess 12 is shown as an arc shape, and a middle of the recess 12 is arched outward. The recess 12 extends along the one end of the peripheral surface 16 of the earphone shell 10. A shape of the one end of the peripheral surface 16 of the earphone shell 10 and a shape of a rear surface of an inner wall of the recess 12 are nearly the same.

Referring to FIG. 1 and FIG. 7, in use, a pair of the wireless blue-tooth earphones 100 are used by a user. When the wireless blue-tooth earphone 100 is used by the user, one end of the wireless blue-tooth earphone 100 adjacent to and inserted into an inside of an ear of the user is defined as a front end of the wireless blue-tooth earphone 100, and the other end of the wireless blue-tooth earphone 100 is defined as a rear end of the wireless blue-tooth earphone 100 opposite to the front end of the wireless blue-tooth earphone 100. The charging case 200 has a base holder 201, and a top cover 202 covered on the base holder 201. When the wireless blue-tooth earphone 100 is charged by the charging case 200, the wireless blue-tooth earphone 100 is positioned in the base holder 201 and is located under the top cover 202, a surface of the wireless blue-tooth earphone 100 facing to the top cover 202 is defined as a top surface 14 of the wireless blue-tooth earphone 100, and a surface of the wireless blue-tooth earphone 100 facing to an inner surface of a bottom of the charging case 200 is defined as a lower surface 15 of the wireless blue-tooth earphone 100. The earphone shell 10 has the top surface 14, the lower surface 15. The peripheral surface 16 of the earphone shell 10 of the wireless blue-tooth earphone 100 is a transition surface connected between the top surface 14 and the lower surface 15 of the earphone shell 10 of the wireless blue-tooth earphone 100.

Correspondingly, in the present invention, a direction towards the inside of the ear of the user is defined as a frontward direction, and a direction opposite to the frontward direction is defined as a rearward direction. A direction towards the top cover 201 is defined as an upward direction, and a direction opposite to the upward direction is defined as a downward direction.

Figure 3:
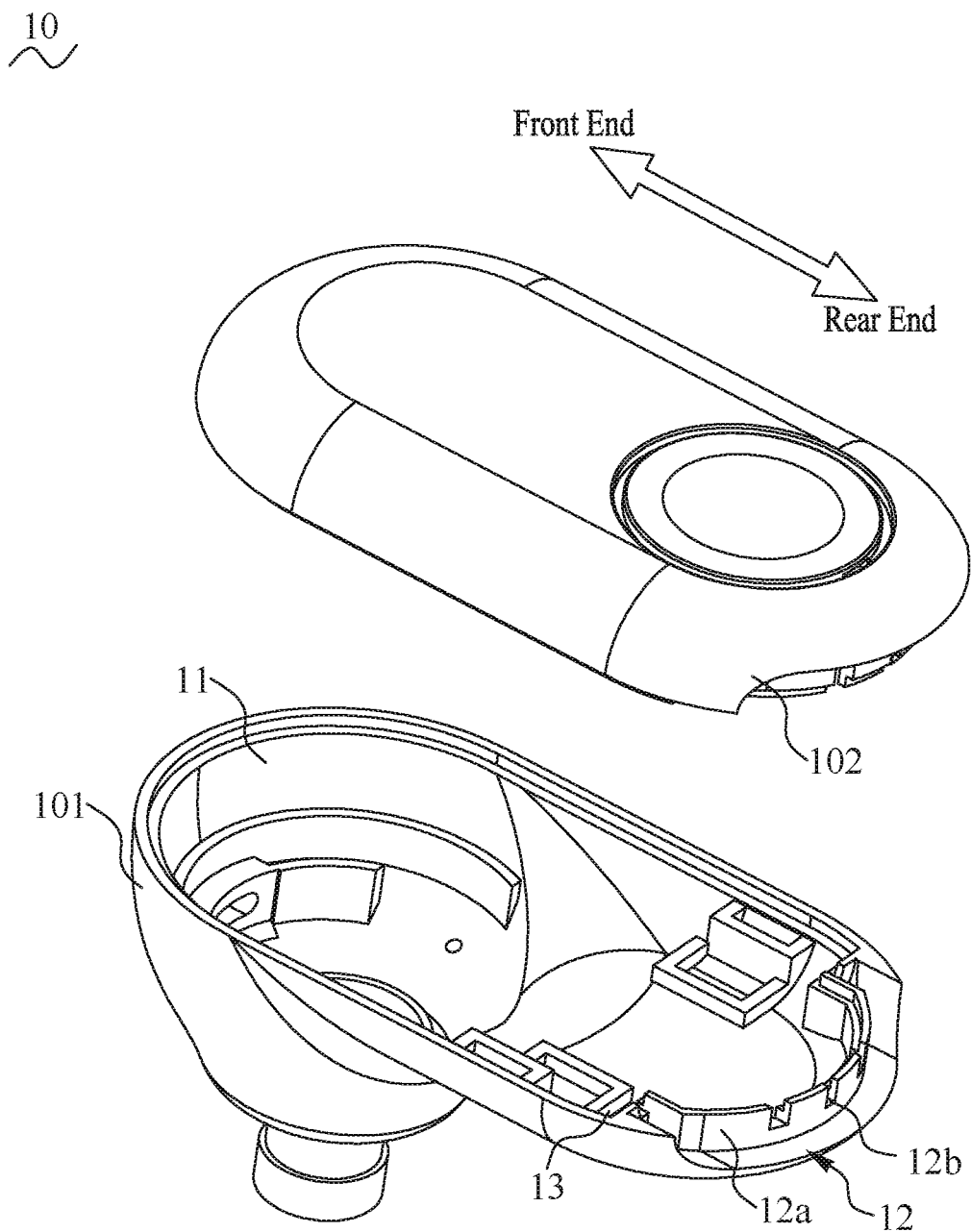
FIG. 3 is an exploded view of an earphone shell of the wireless blue-tooth earphone in accordance with the present invention.
Figure 4:
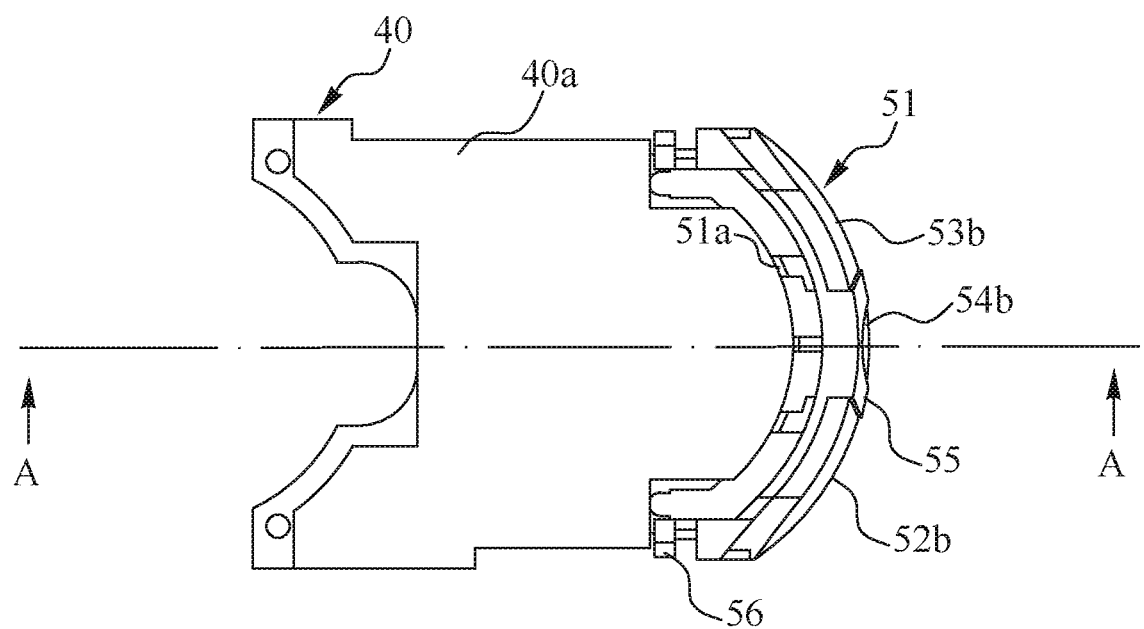
FIG. 4 is a top view of a circuit board assembly and a contact assembly of the wireless blue-tooth earphone in accordance with the present invention.

Referring to FIG. 1, FIG. 2 and FIG. 3, the earplug 20 is assembled to a bottom of the earphone shell 10, and the earplug 20 is mounted to a bottom of a front end of the earphone shell 10. The speaker unit 30 is accommodated in a front end of the accommodating space 11 and is adjacent to the earplug 20. The circuit board assembly 40 is accommodated in a rear end of the accommodating space 11 and is connected with the speaker unit 30. The contact assembly 50 is fastened in the recess 12. The contact assembly 50 has at least three conducting elements 51 arranged in the recess 12 and along an extending direction of the recess 12. The contact assembly 50 has a plurality of conducting elements 51 arranged in the recess 12 and along a horizontal direction. The plurality of the conducting elements 51 are juxtaposed along the horizontal direction. The plurality of the conducting elements 51 are electrically connected with the circuit board assembly 40, and the plurality of the conducting elements 51 and the circuit board assembly 40 are conductive. Each conducting element 51 has a camber structure 51b extending sideward and along the one end of the peripheral surface 16 of the earphone shell 10. An outer surface of the camber structure 51b is curved along the horizontal direction and an up-down direction vertical to the horizontal direction. The camber structure 51b of each conducting element 51 is received in the recess 12 and is covered to the rear surface of the inner wall of the recess 12 along the horizontal direction.

Referring to FIG. 2 and FIG. 3, in the preferred embodiment, the recess 12 is formed at the rear end of the earphone shell 10, and the recess 12 is formed by a rear end of the peripheral surface of the earphone shell 10 being recessed towards the accommodating space 11. The inner wall of the recess 12 is defined as an isolating board 12a. The accommodating space 11 is spaced from an outside space by the isolating board 12a. The accommodating space 11 and the recess 12 are isolated by the isolating board 12a. At least three portions of a top surface of the isolating board 12a are recessed downward to form at least three notches 12b penetrating through a front surface and a rear surface of the isolating board 12a of the recess 12. The at least three notches 12b are communicated between the accommodating space 11 and the recess 12. Each conducting element 51 has a connecting portion 51a extended transversely, and towards the recess 12 and the accommodating space 11 from the camber structure 51b. The connecting portion 51a of each conducting element 51 passes through the recess 12 and one notch 12b of the isolating board 12a, and the connecting portion 51a of each conducting element 51 projects into and is accommodated in the accommodating space 11.

Referring to FIG. 1 to FIG. 5, the circuit board assembly 40 is assembled in the accommodating space 11 of the earphone shell 10. A lower surface of the circuit board assembly 40 is equipped with a plurality of elastic elements 41. The plurality of the elastic elements 41 are arranged next to the recess 12. The plurality of the elastic elements 41 are electrically connected with the connecting portions 51a of the plurality of the conducting elements 51.

Specifically, the circuit board assembly 40 includes an upper circuit board 40a arranged at an upper portion of the circuit board assembly 40, and a lower circuit board 40b arranged at a lower portion of the circuit board assembly 40. The lower circuit board 40b is located under the upper circuit board 40a. The lower circuit board 40b is spaced from the upper circuit board 40a to form a clamping space 40c between the upper circuit board 40a and the lower circuit board 40b. The plurality of the elastic elements 41 are soldered to a lower surface of the upper circuit board 40a. The plurality of the elastic elements 41 are received in the clamping space 40c and projects beyond a rear end of a lower portion of the clamping space 40c. Each elastic element 41 has an arch-shaped contact portion 41a arched downward at a front end of each elastic element 41. If the lower circuit board 40b has a portion located under the contact portion 41a of each elastic element 41, a convex surface of the contact portion 41a is able to be towards the portion of the lower circuit board 40b which is located under the contact portion 41a of each elastic element 41. The plurality of the contact portions 41a of the plurality of the elastic elements 41 are electrically connected with the connecting portions 51a of the plurality of the conducting elements 51.

Referring to FIG. 1, FIG. 2, FIG. 6 and FIG. 7, in order to insert the wireless blue-tooth earphone 100 into the charging case 200 correspondingly, the plurality of the conducting elements 51 are electrically connected with the charging case 200. An upper portion of an inner wall of the charging case 200 has two long edges 203, and two short edges 204 connected between the two long edges 203. The base holder 201 has the two long edges 203 and the two short edges 204. One short edge 204 is connected with two ends of the two long edges 203, and the other short edge 204 is connected with the other two ends of the two long edges 203. The two short edges 204 are narrow edges. An inside of the charging case 200 has two receiving spaces 205 abreast arranged and spaced from each other. The two receiving spaces 205 are matched with the pair of the wireless blue-tooth earphones 100. In order to cooperate a simple manufacture procedure of the charging case 200 and decrease manufacturing time of the charging case 200 so as to lower a cost of the charging case 200, each short edge 204 which is the narrow edge is equipped with at least three conductive pieces 210. Each short edge 204 of the charging case 200 which is the narrow edge is equipped with a plurality of the conductive pieces 210.

Each conductive piece 210 has a curved structure 210a formed at a top end of each conductive piece 210. A convex surface of the curved structure 210a is arched towards the inside of the charging case 200. The convex surface of the curved structure 210a is arched towards an inside of the base holder 201 of the charging case 200. The curved structure 210a of each conductive piece 210 is exposed to the inner wall of the charging case 200. The curved structure 210a of each conductive piece 210 is exposed beyond an inner surface of the base holder 201 of the charging case 200. The camber structures 51b of the plurality of the conducting elements 51 contact with and resist against the convex surfaces of the curved structures 210a of the plurality of the conductive pieces 210. The plurality of the conductive pieces 210 of the charging case 200 are prevented from being arranged to other positions of the charging case 200, in detail, the plurality of the conductive pieces 210 of the charging case 200 are prevented from being arranged to the two long edges 203 of the inner wall of the charging case 200, a bottom of the inside of the charging case 200 and a top of the inside of the charging case 200, and the plurality of the conductive pieces 210 of the charging case 200 are prevented from being arranged to a bottom of the charging case 200 and a top of the charging case 200, correspondingly, a complexity of the manufacture procedure of the charging case 200 is prevented from being caused, and a problem of increasing the cost of the charging case 200 is prevented being occurred.

Thus, the plurality of the conductive pieces 210 are arranged to the two short edges 204 of the inner wall of the charging case 200. In order to also cooperate a simple design of a charging structure of the charging case 200 to lower the cost of the charging case 200, when a bottom surface of the wireless blue-tooth earphone 100 is correspondingly inserted into the bottom of the charging case 200, specifically, when the bottom surface of the wireless blue-tooth earphone 100 is correspondingly inserted into the bottom of the inside of the charging case 200, the plurality of the conducting elements 51 of the wireless blue-tooth earphone 100 are intensively arranged at an outer surface of the rear end of the earphone shell 10, the plurality of the conducting elements 51 arranged at the rear end of the wireless blue-tooth earphone 100 resist against the plurality of the conductive pieces 210 of the two short edges 204 of the inner wall of the charging case 200 to reach a charging effect.

Referring to FIG. 1 to FIG. 7, in the preferred embodiment, the plurality of the conducting elements 51 include a positive conduction part 52, a negative conduction part 53, and a conduction component 54 located between the positive conduction part 52 and the negative conduction part 53. The positive conduction part 52 and the negative conduction part 53 are arranged to two sides of the conduction component 54. The positive conduction part 52 and the negative conduction part 53 are located at two sides of the contact assembly 50. The positive conduction part 52 and the negative conduction part 53 are arranged in two sides of the recess 12, and the positive conduction part 52 and the negative conduction part 53 are symmetrical to each other with respect to the conduction component 54. The positive conduction part 52, the negative conduction part 53 and the conduction component 54 are fastened in the recess 12 along the horizontal direction. The positive conduction part 52, the conduction component 54 and the negative conduction part 53 are juxtaposed from one side of the recess 12 to the other side of the recess 12. The conduction component 54 is used to transmit data signals, and the positive conduction part 52 and the negative conduction part 53 are used to transmit power signals.

Referring to FIG. 1 to FIG. 6, each of the positive conduction part 52 and the negative conduction part 53 has an upper edge 581, a lower edge 582 located under the upper edge 581, an inner concave edge 571, and an outer convex edge 572 away from the inner concave edge 571. The inner concave edge 571, the upper edge 581, the outer convex edge 572 and the lower edge 582 of each of the positive conduction part 52 and the negative conduction part 53 are smoothly connected in sequence. The positive conduction part 52 and the negative conduction part 53 are arranged in a mirror-image arrangement. The inner concave edges 571 of the positive conduction part 52 and the negative conduction part 53 are symmetrical to each other with respect to the conduction component 54. The outer convex edges 572 of the positive conduction part 52 and the negative conduction part 53 are symmetrical to each other with respect to the conduction component 54, the upper edges 581 of the positive conduction part 52 and the negative conduction part 53 are symmetrical to each other with respect to the conduction component 54, and the lower edges 582 of the positive conduction part 52 and the negative conduction part 53 are symmetrical to each other with respect to the conduction component 54.

Figure 5:
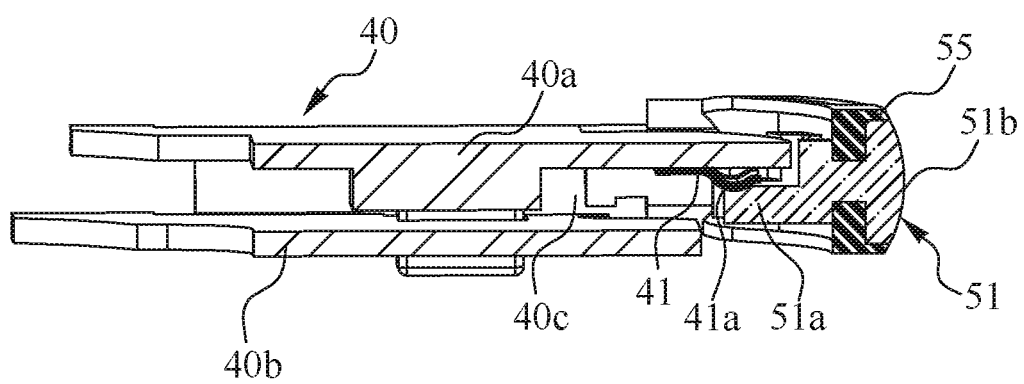
FIG. 5 is a sectional view of the circuit board assembly and the contact assembly of the wireless blue-tooth earphone along a line A-A of FIG. 4.
Figure 6:
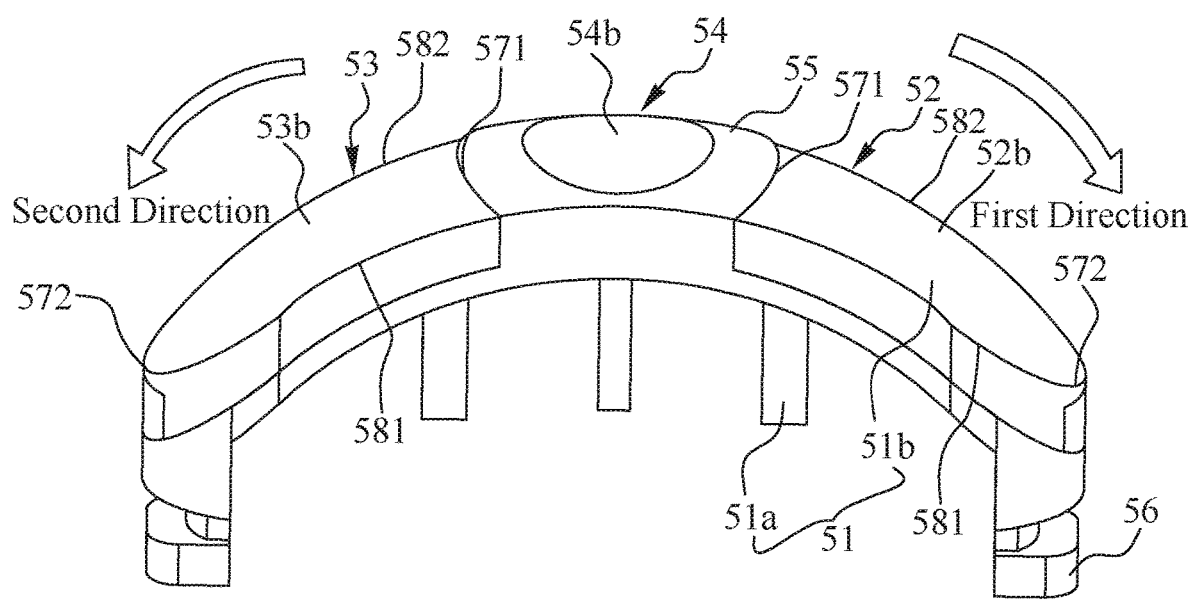
FIG. 6 is a perspective view of the contact assembly of the wireless blue-tooth earphone in accordance with the present invention.

The positive conduction part 52 has a positive camber structure 52b extended along an extending direction of the one side of the recess 12 which is defined as a first direction shown in FIG. 5, and the negative conduction part 53 has a negative camber structure 53b extended along an extending direction of the other side of the recess 12 which is defined as a second direction shown in FIG. 5. The positive camber structure 52b is covered to an inner wall of the one side of the recess 12 to increase a contact area of the positive camber structure 52b resisting against the charging case 200 at the time of the wireless blue-tooth earphone 100 being charged by the charging case 200. The negative camber structure 53b is covered to an inner wall of the other side of the recess 12 to increase a contact area of the negative camber structure 53b resisting against the charging case 200 at the time of the wireless blue-tooth earphone 100 being charged by the charging case 200.

The conduction component 54 has a circular camber structure 54b. The circular camber structure 54b of the conduction component 54 is arranged in a middle of the recess 12 and is located between the positive camber structure 52b of the positive conduction part 52 and the negative camber structure 53b of the negative conduction part 53. The positive conduction part 52, the conduction component 54 and the negative conduction part 53 are juxtaposed and are covered to the inner wall of the recess 12 of the outer surface of the rear end of the earphone shell 10, so the user more easily distinguish positions of the positive conduction part 52, the conduction component 54 and the negative conduction part 53 of the wireless blue-tooth earphone 100 to make the wireless blue-tooth earphone 100 correspondingly inserted into the charging case 200. When the wireless blue-tooth earphone 100 is inserted into the charging case 200, the plurality of the conductive pieces 210 of the two narrow edges of the inner wall of the charging case 200 correspondingly resist against the positive conduction part 52, the conduction component 54 and the negative conduction part 53 simultaneously to prevent at least one of the positive conduction part 52, the conduction component 54 and the negative conduction part 53 being misaligned with the charging case 200 to occur a poor contact phenomenon between the wireless blue-tooth earphone 100 and the charging case 200. The positive camber structure 52b, the circular camber structure 54b and the negative camber structure 53b resist against the plurality of the conductive pieces 210 of the charging case 200. The contact areas of the positive camber structure 52b and the negative camber structure 53b are increased, so that the plurality of the conducting elements 51 have no need of being further aligned with the plurality of the conductive pieces 210 of the charging case 200, the plurality of the conducting elements 51 are also able to resist against the plurality of the conductive pieces 210 of the charging case 200 to reach an electrical connection effect between the wireless blue-tooth earphone 100 and the charging case 200.

Referring to FIG. 1 to FIG. 7 again, in the preferred embodiment, in order to further make the positive conduction part 52, the conduction component 54 and the negative conduction part 53 separated from one another to prevent a short circuit phenomenon being occurred, the contact assembly 50 includes a plastic shell 55 integrally molded with the plurality of the conducting elements 51. The connecting portions 51a of the plurality of the conducting elements 51 penetrate through the plastic shell 55 along the horizontal direction. The plurality of the conducting elements 51 are fastened to the plastic shell 55 along the horizontal direction. The plurality of the conducting elements 51 are arranged in sequence from the one side of the recess 12 to the other side of the recess 12 along the horizontal direction. The plurality of the conducting elements 51 are separated from one another by the plastic shell 55.

The positive conduction part 52, the conduction component 54 and the negative conduction part 53 are arranged in sequence, the plastic shell 55 is formed by adopting an insert molding technology, specifically, the plastic shell 55 is formed by an injection molding technology, and the plastic shell 55 is formed by surrounding plastic around the positive conduction part 52, the conduction component 54 and the negative conduction part 53 in a mold, the positive conduction part 52, the conduction component 54 and the negative conduction part 53 are separated from one another by the plastic shell 55, and the plastic shell 55 is surrounded around the positive camber structure 52b of the positive conduction part 52, the circular camber structure 54b of the conduction component 54 and the negative camber structure 53b of the negative conduction part 53 to combine the plastic shell 55 with the plurality of the conducting elements 51, so the contact assembly 50 completes a one-piece design.

The positive conduction part 52, the conduction component 54 and the negative conduction part 53 are juxtaposed and are covered to the inner wall of the recess 12 of the outer surface of the rear end of the earphone shell 10, and outer surfaces of the positive conduction part 52, the conduction component 54 and the negative conduction part 53 are smoothly connected, so that the outer surface of the rear end of the earphone shell 10 keeps a smooth structure, and the outer surface of the rear end of the earphone shell 10 is smooth. The positive camber structure 52b, the circular camber structure 54b and the negative camber structure 53b are smoothly connected, so the outer surface of the rear end of the earphone shell 10 is smooth.

Referring to FIG. 2 and FIG. 5, in order to fasten the contact assembly 50 in the recess 12, and make the peripheral surface 16 of the earphone shell 10 and an outer surface of the contact assembly 50 maintain a smooth status. In the preferred embodiment, the contact assembly 50 has two limiting portions 56 protrude oppositely and arranged on both sides of the contact assembly 50. The two limiting portions 56 are arranged at two opposite sides of the plastic shell 55, and the two limiting portions 56 are adjacent to and towards the accommodating space 11. Two sides of a lower portion of an inside of the earphone shell 10 define two limiting slots 13 located to two sides of the recess 12 and communicated with the accommodating space 11. Two sides of an inside of the lower shell 101 define the two limiting slots 13 arranged in front of the two sides of the recess 12. The two limiting slots 13 are matched with the two limiting portions 56. The two limiting portions 56 are limited in the two limiting slots 13, so that the contact assembly 50 is fastened to the lower shell 101, and the contact assembly 50 is fastened in the recess 12.

As described above, the circuit board assembly 40 is electrically connected with the plurality of the conducting elements 51 by virtue of the plurality of the contact portions 41a of the plurality of the elastic elements 41 being electrically connected with the connecting portions 51a of the plurality of the conducting elements 51, and the positive camber structure 52b extended along the extending direction of the one side of the recess 12, and the negative camber structure 53b extended along the extending direction of the other side of the recess 12, so that the positive camber structure 52b is covered to the inner wall of the one side of the recess 12 to increase the contact area of the positive camber structure 52b resisting against the charging case 200 at the time of the wireless blue-tooth earphone 100 being charged by the charging case 200, and the negative camber structure 53b is covered to the inner wall of the other side of the recess 12 to increase the contact area of the negative camber structure 53b resisting against the charging case 200 at the time of the wireless blue-tooth earphone 100 being charged by the charging case 200, when the wireless blue-tooth earphone 100 is inserted into the charging case 200 which is matched with the wireless blue-tooth earphone 100 to be charged, a poor contact phenomenon between the wireless blue-tooth earphone 100 and the charging case 200 is prevented from being occurred.

What is claimed is:

1. A wireless blue-tooth earphone being chargeable by a charging case, the charging case being equipped with a plurality of conductive pieces, the wireless blue-tooth earphone comprising:
   an earphone shell having an accommodating space penetrating through a lower portion of the earphone shell, one end of a peripheral surface of the earphone shell being recessed inward to form a recess, the recess extending along the one end of the peripheral surface of the earphone shell;
   an earplug assembled to a bottom of the earphone shell;
   a speaker unit accommodated in a front end of the accommodating space;
   a circuit board assembly being accommodated in a rear end of the accommodating space and being connected with the speaker unit, a lower surface of the circuit board assembly being equipped with a plurality of elastic elements arranged next to the recess; and
   a contact assembly fastened in the recess, the contact assembly having a plurality of conducting elements arranged in the recess and along a horizontal direction, the plurality of the conducting elements being juxtaposed, the plurality of the elastic elements being electrically connected with the plurality of the conducting elements, each conducting element having a camber structure extending sideward and along the one end of the peripheral surface of the earphone shell, the camber structures of the plurality of the conducting elements resisting against the plurality of the conductive pieces, the camber structure of each conducting element being received in the recess and being covered to the recess along the horizontal direction.

2. The wireless blue-tooth earphone as claimed in claim 1, wherein the recess is formed at a rear end of the earphone shell, and the recess is formed by a rear end of the peripheral surface of the earphone shell being recessed towards the accommodating space, an inner wall of the recess is defined as an isolating board, the accommodating space is spaced from an outside space by the isolating board.

3. The wireless blue-tooth earphone as claimed in claim 2, wherein at least three portions of a top surface of the isolating board are recessed downward to form at least three notches penetrating through a front surface and a rear surface of the isolating board of the recess, the at least three notches are communicated between the accommodating space and the recess, each conducting element has a connecting portion extended transversely and towards the recess and the accommodating space from the camber structure, the connecting portion of each conducting element passes through the recess and one notch, the plurality of the elastic elements are electrically connected with the connecting portions of the plurality of the conducting elements.

4. The wireless blue-tooth earphone as claimed in claim 1, wherein the contact assembly includes a plastic shell integrally molded with the plurality of the conducting elements, the plurality of the conducting elements are arranged in sequence from one side of the recess to the other side of the recess, the plurality of the conducting elements are separated from one another by the plastic shell.

5. The wireless blue-tooth earphone as claimed in claim 4, wherein the plurality of the conducting elements are fastened to the plastic shell along the horizontal direction.

6. The wireless blue-tooth earphone as claimed in claim 4, wherein the contact assembly has two limiting portions protrude oppositely and arranged on both sides of the contact assembly, the two limiting portions are arranged at two opposite sides of the plastic shell, and the two limiting portions are adjacent to and towards the accommodating space, two sides of a lower portion of an inside of the earphone shell define two limiting slots located to two sides of the recess and communicated with the accommodating space, the two limiting slots are matched with the two limiting portions, the two limiting portions are limited in the two limiting slots.

7. The wireless blue-tooth earphone as claimed in claim 1, wherein the plurality of the conducting elements include a positive conduction part, a negative conduction part, and a conduction component located between the positive conduction part and the negative conduction part, the positive conduction part, the negative conduction part and the conduction component are fastened in the recess along the horizontal direction, the positive conduction part, the conduction component and the negative conduction part are juxtaposed from one side of the recess to the other side of the recess.

8. The wireless blue-tooth earphone as claimed in claim 7, wherein the positive conduction part and the negative conduction part are arranged in two sides of the recess, and the positive conduction part and the negative conduction part are symmetrical to each other with respect to the conduction component.

9. The wireless blue-tooth earphone as claimed in claim 7, wherein the positive conduction part and the negative conduction part are located at two sides of the contact assembly.

10. The wireless blue-tooth earphone as claimed in claim 7, wherein the positive conduction part, the conduction component and the negative conduction part are juxtaposed and are covered to an inner wall of the recess of an outer surface of a rear end of the earphone shell, and outer surfaces of the positive conduction part, the conduction component and the negative conduction part are smoothly connected, so that the outer surface of the rear end of the earphone shell keeps a smooth structure.

11. The wireless blue-tooth earphone as claimed in claim 7, wherein the positive conduction part has a positive camber structure extended along an extending direction of the one side of the recess, and the negative conduction part has a negative camber structure extended along an extending direction of the other side of the recess, the conduction component has a circular camber structure, the positive camber structure is covered to an inner wall of the one side of the recess, the negative camber structure is covered to an inner wall of the other side of the recess, the circular camber structure is arranged in a middle of the recess and is located between the positive camber structure and the negative camber structure, the positive camber structure, the circular camber structure and the negative camber structure are smoothly connected, so an outer surface of a rear end of the earphone shell is smooth.

12. A wireless blue-tooth earphone being chargeable by a charging case, the charging case being equipped with a plurality of conductive pieces, comprising:
an earphone shell having an accommodating space penetrating through a lower portion of the earphone shell, one end of a peripheral surface of the earphone shell being recessed inward to form a recess;
an earplug assembled to a bottom of the earphone shell;
a speaker unit accommodated in a front end of the accommodating space;
a circuit board assembly being accommodated in a rear end of the accommodating space and being connected with the speaker unit, a lower surface of the circuit board assembly being equipped with a plurality of elastic elements arranged next to the recess; and
a contact assembly fastened in the recess, the contact assembly having a plurality of conducting elements arranged in the recess, the plurality of the conducting elements including a positive conduction part, a negative conduction part, and a conduction component located between the positive conduction part and the negative conduction part, the positive conduction part, the negative conduction part and the conduction component being fastened in the recess, the positive conduction part, the conduction component and the negative conduction part being juxtaposed from one side of the recess to the other side of the recess, the plurality of the elastic elements being electrically connected with the plurality of the conducting elements, the positive conduction part having a positive camber structure extended along an extending direction of the one side of the recess, and the negative conduction part having a negative camber structure extended along an extending direction of the other side of the recess, the conduction component having a circular camber structure, the positive camber structure being covered to an inner wall of the one side of the recess, the negative camber structure being covered to an inner wall of the other side of the recess, the circular camber structure being arranged in a middle of the recess and being located between the positive camber structure and the negative camber structure, the positive camber structure, the circular camber structure and the negative camber structure resisting against the plurality of the conductive pieces of the charging case.

13. A wireless blue-tooth earphone being chargeable by a charging case, the charging case being equipped with a plurality of conductive pieces, the wireless blue tooth earphone comprising:
an earphone shell having an accommodating space penetrating through a lower portion of the earphone shell, one end of a peripheral surface of the earphone shell being recessed inward to form a recess;
an earplug assembled to a bottom of the earphone shell;
a speaker unit accommodated in the accommodating space;
a circuit board assembly being accommodated in the accommodating space and being connected with the speaker unit; and
a contact assembly fastened in the recess, the contact assembly having a plurality of conducting elements arranged in the recess, the plurality of the conducting elements being juxtaposed along a horizontal direction, each conducting element having a camber structure extending sideward and along the one end of the peripheral surface of the earphone shell, an outer surface of the camber structure being curved along the horizontal direction and an up-down direction vertical to the horizontal direction, the camber structures of the plurality of the conducting elements resisting against the plurality of the conductive pieces, the camber structure of each conducting element being received in the recess and being covered to the recess.

14. The wireless blue-tooth earphone as claimed in claim 13, wherein the contact assembly includes a plastic shell integrally molded with the plurality of the conducting elements, the plurality of the conducting elements are arranged in sequence from one side of the recess to the other side of the recess along the horizontal direction, the plurality of the conducting elements are separated from one another by the plastic shell.

15. The wireless blue-tooth earphone as claimed in claim 13, wherein the plurality of the conducting elements has a positive conduction part, a negative conduction part, and a conduction component located between the positive conduction part and the negative conduction part, the positive conduction part, the negative conduction part and the conduction component are fastened in the recess along the horizontal direction, the positive conduction part, the conduction component and the negative conduction part are juxtaposed from one side of the recess to the other side of the recess.

16. The wireless blue-tooth earphone as claimed in claim 15, wherein each of the positive conduction part and the negative conduction part has an upper edge, a lower edge located under the upper edge, an inner concave edge, and an outer convex edge away from the inner concave edge, the inner concave edge, the upper edge, the outer convex edge and the lower edge of each of the positive conduction part and the negative conduction part are smoothly connected in sequence, the positive conduction part and the negative conduction part are arranged in a mirror-image arrangement, the inner concave edges of the positive conduction part and the negative conduction part are symmetrical to each other with respect to the conduction component, the outer convex edges of the positive conduction part and the negative conduction part are symmetrical to each other with respect to the conduction component, the upper edges of the positive conduction part and the negative conduction part are symmetrical to each other with respect to the conduction component, and the lower edges of the positive conduction part and the negative conduction part are symmetrical to each other with respect to the conduction component.

17. The wireless blue-tooth earphone as claimed in claim 16, wherein the conduction component has a circular camber structure, the positive conduction part has a positive camber structure extended along an extending direction of the one side of the recess, and the negative conduction part has a negative camber structure extended along an extending direction of the other side of the recess, the positive camber structure is covered to an inner wall of the one side of the recess, the negative camber structure is covered to an inner wall of the other side of the recess, the circular camber structure of the conduction component is arranged in a middle of the recess and is located between the positive camber structure of the positive conduction part and the negative camber structure of the negative conduction part.

18. The wireless blue-tooth earphone as claimed in claim 13, wherein each conducting element has a connecting portion extended transversely and towards the recess and the accommodating space from the camber structure, an inner wall of the recess is defined as an isolating board, the accommodating space is spaced from the recess by the isolating board, the connecting portion of each conducting element passes through the recess and the isolating board.

19. The wireless blue-tooth earphone as claimed in claim 18, wherein at least three portions of a top surface of the isolating board are recessed downward to form at least three notches penetrating through a front surface and a rear surface of the isolating board of the recess, the at least three notches are communicated between the accommodating space and the recess, the connecting portion of each conducting element passes through the recess and one notch.

20. The wireless blue-tooth earphone as claimed in claim 19, wherein a surface of the circuit board assembly being equipped with a plurality of elastic elements arranged next to the recess, each elastic element has an arch-shaped contact portion arched downward at a front end of each elastic element, the plurality of the contact portions of the plurality of the elastic elements are electrically connected with the connecting portions of the plurality of the conducting elements.

* * * * *